US012418726B2

(12) United States Patent
Kudo (10) Patent No.: US 12,418,726 B2
(45) Date of Patent: Sep. 16, 2025

(54) IMAGE CAPTURING APPARATUS, CONTROL METHOD THEREOF, AND STORAGE MEDIUM (71) Applicant: CANON KABUSHIKI KAISHA, Tokyo (JP)

(72) Inventor: Keisuke Kudo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 262 days.

(21) Appl. No.: 18/453,543

(22) Filed: Aug. 22, 2023

(65) Prior Publication Data
US 2024/0073541 A1 Feb. 29, 2024

(30) Foreign Application Priority Data
Aug. 30, 2022 (JP) ................. 2022-137105

(51) Int. Cl.
H04N 23/74 (2023.01)
H04N 23/67 (2023.01)

(52) U.S. Cl.
CPC .......... H04N 23/74 (2023.01); H04N 23/675 (2023.01)

(58) Field of Classification Search
CPC .......... H04N 1/32101; H04N 2101/00; H04N 2201/3242; H04N 2201/3274; H04N 23/672; H04N 23/56; H04N 23/634; H04N 23/667; H04N 23/671; H04N 23/74; H04N 25/704; H04N 23/675; H05B 45/18; H05B 47/19; H05B 45/22; G01K 3/005; G01K 7/42; G01R 19/0084; G03B 2206/00; G03B 2215/0514; G03B 2215/0567; G03B 15/05
See application file for complete search history.

(56) References Cited

U.S. PATENT DOCUMENTS

| | | | | |
|---|---|---|---|---|
| 2008/0106637 A1* | 5/2008 | Nakao | ..................... | H04N 23/56 348/E5.029 |
| 2008/0309792 A1* | 12/2008 | Takagi | .................... | H04N 23/74 348/229.1 |
| 2010/0165180 A1* | 7/2010 | Park | ........................ | H04N 23/56 348/E5.022 |
| 2012/0162462 A1* | 6/2012 | Takeuchi | ............. | H04N 23/673 348/222.1 |
| 2017/0231471 A1* | 8/2017 | Nishio | ................. | A61B 1/0655 348/67 |
| 2018/0139371 A1* | 5/2018 | Kumon | ................ | H04N 23/671 |
| 2019/0141255 A1* | 5/2019 | Hamano | ................ | H04N 23/56 |

FOREIGN PATENT DOCUMENTS

| | | |
|---|---|---|
| JP | 2000-338386 A | 12/2000 |
| JP | 2003-005023 A | 1/2003 |
| JP | 2009-222985 A | 10/2009 |

* cited by examiner

Primary Examiner — Lin Ye
Assistant Examiner — Tuan H Le
(74) Attorney, Agent, or Firm — Cowan, Liebowitz & Latman, P.C.

(57) ABSTRACT

An image capturing apparatus includes a photometry unit that performs photometry of a subject, a focus detection unit that receives light from a subject and performs focus detection, and a control unit that controls an assist light device that emits assist light that illuminates a subject. The control unit controls, based on an output of the photometry unit, a light emission amount of the assist light device in such a manner that a cycle of focus detection according to a time required for the focus detection unit to perform focus detection becomes faster than a predetermined cycle.

16 Claims, 10 Drawing Sheets

IMAGE CAPTURING APPARATUS, CONTROL METHOD THEREOF, AND STORAGE MEDIUM

BACKGROUND OF THE INVENTION

Field of the Invention

The present invention relates to a light emission control technique of AF assist light in automatic focus adjustment of an image capturing apparatus.

Description of the Related Art

An autofocus (AF) sensor of a single-lens reflex camera is compatible with light in an infrared wavelength range, and infrared light has been used as AF assist light.

However, since an AF sensor embedded in an image capturing element of a recent mirrorless camera is compatible with light in a visible wavelength range, a flash light emission system that performs focus detection by intermittently emitting light at predetermined time intervals has come to be used as AF assist light.

A method of using intermittent light emission as AF assist light is disclosed in Japanese Patent Laid-Open No. 2000-338386 and Japanese Patent Laid-Open No. 2009-222985.

AF assist light of LED light emission system using, as AF assist light, white or light bulb color LEDs built in a camera or a strobe has been widely known.

For example, Japanese Patent Laid-Open No. 2003-5023 discloses a technique in which an ambient temperature of an LED used as AF assist light is acquired by a thermistor, and the brightness of the LED is changed by any of a current change, a voltage change, and a duty change by PWM control according to a value of the acquired ambient temperature.

In the light emission control of the AF assist light described above, when a flash light emission method is used in a case where the subject is a person in particular, light emission is instantaneously performed in a state where the pupil of the person is opened, and therefore there is a possibility that the person feels very dazzled and uncomfortable.

On the other hand, even when the light emission method of the LED is used, a large light emission amount per unit time similarly gives discomfort by dazzle.

A small light emission amount per unit time for suppressing dazzle raises the need to increase the length of time of accumulation time in image capturing for focus detection, and there is a possibility that the frame rate is lowered and the length of time of AF processing is increased.

SUMMARY OF THE INVENTION

The present invention has been made in view of the above-described problems, and provides an image capturing apparatus that can reduce dazzle of AF assist light while suppressing an increase in length of time of AF processing.

According to a first aspect of the present invention, there is provided an image capturing apparatus comprising: at least one processor or circuit configured to function as: a photometry unit that performs photometry of a subject; a focus detection unit that receives light from a subject and performs focus detection; and a control unit that controls an assist light device that emits assist light that illuminates a subject, wherein, based on an output of the photometry unit, the control unit controls a light emission amount of the assist light device in such a manner that a cycle of focus detection according to a time required for the focus detection unit to perform focus detection becomes faster than a predetermined cycle.

According to a second aspect of the present invention, there is provided a method of controlling an image capturing apparatus including a photometry unit that performs photometry of a subject and a focus detection unit that receives light from a subject and performs focus detection, the method comprising: controlling an assist light device that emits assist light for illuminating a subject, wherein the control includes controlling a light emission amount of the assist light device in such a manner that a cycle of focus detection according to time required for the focus detection unit to perform focus detection becomes faster than a predetermined cycle, based on an output of the photometry unit.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
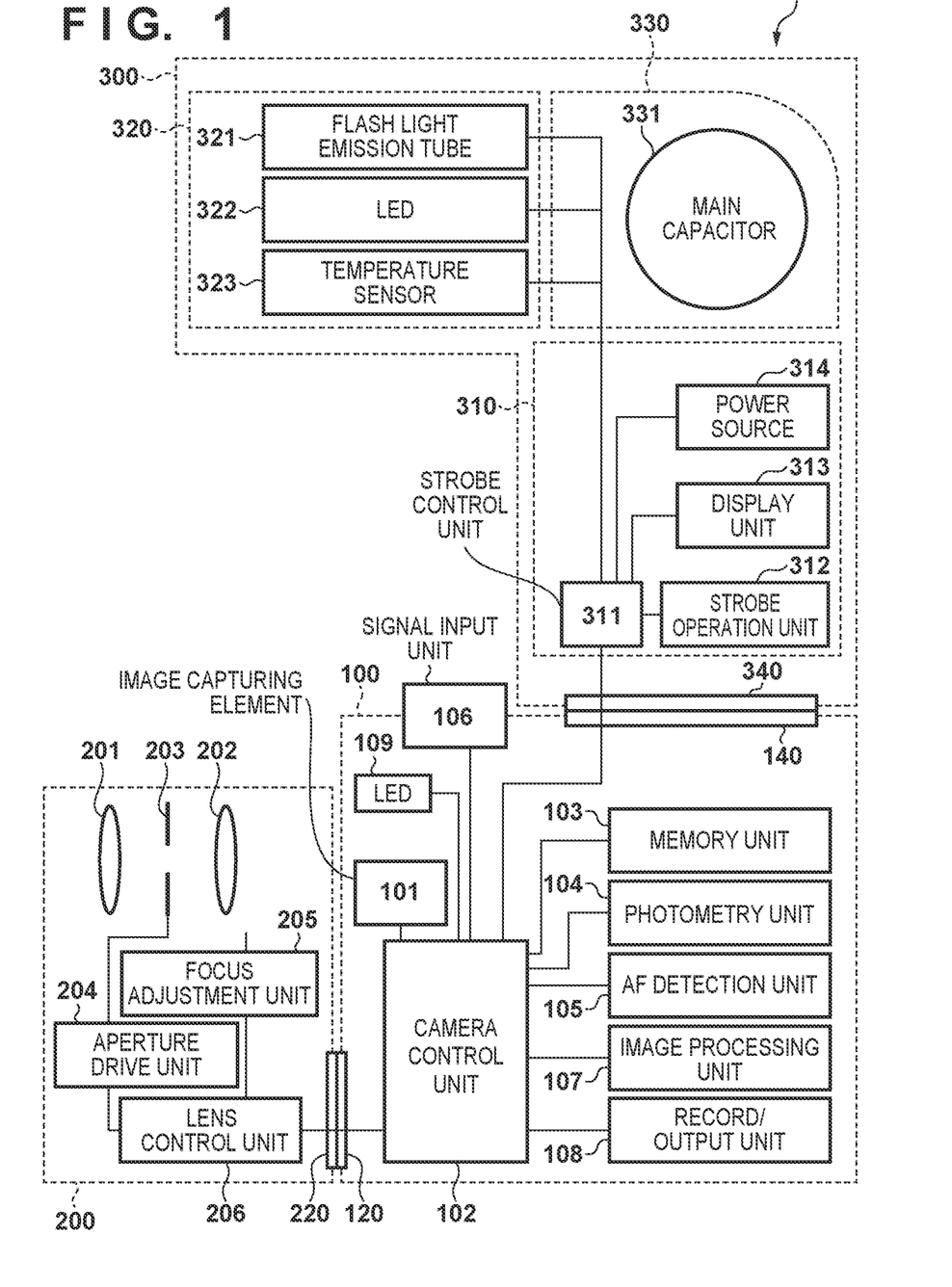
FIG. 1 is a block diagram illustrating a hardware configuration of a camera system.

A configuration of a camera system 1 including a light emission apparatus 300, which is a first embodiment of an image capturing apparatus of the present invention, will be described with reference to FIG. 1. FIG. 1 is a block diagram illustrating a hardware configuration of the camera system 1 of the present embodiment.

The camera system 1 includes a camera body 100, a lens apparatus (interchangeable lens) 200 removable from the camera body 100, and the light emission apparatus (external strobe) 300. However, the camera system 1 is not limited to the configuration of the present embodiment as long as the light emission apparatus 300 is connected to the image capturing apparatus. For example, in place of the camera body 100 and the lens apparatus 200 being removably configured, the camera body and the lens may be integrally configured.

The camera body 100 includes an image capturing element 101, a camera control unit 102, a memory unit 103, a photometry unit 104, an autofocus (AF) detection unit 105, a signal input unit 106, an image processing unit 107, a record/output unit 108, an LED 109, a camera mount unit 120, and a camera-side ACC connection unit 140.

The image capturing element 101 includes, for example, a CCD and a CMOS sensor, photoelectrically converts (receives) an optical image formed on an on-imaging plane of the image capturing element 101 by a photographing optical system of the lens apparatus 200, and outputs an obtained analog image signal to the camera control unit 102.

The camera control unit 102 is a control means included in the camera body 100, reads a control program for each block included in the camera body 100 from a ROM included in the memory unit 103, develops the control program in a RAM included in the memory unit 103, and executes the control program. This enables the camera control unit 102 to control the operation of each block included in the camera body 100, and to integrally control the camera body 100 and the lens apparatus 200. The camera control unit 102 is connected with the image capturing element 101, the memory unit 103, the photometry unit 104, the AF detection unit 105, the signal input unit 106, the image processing unit 107, the record/output unit 108, the LED 109, the camera mount unit 120, the camera-side ACC connection unit 140, and the like.

The camera control unit 102 internally includes an A/D conversion unit, and in a case where the analog image signal output from the image capturing element 101 is A/D converted by the A/D conversion unit, stores this as image data in the RAM included in the memory unit 103. In a case of causing the image capturing element 101 to function as a photometry sensor or in a case of using a part of pixels constituting the image capturing element 101 for phase difference detection, the camera control unit 102 outputs, to the memory unit 103 as it is, the analog image signal output from the image capturing element 101.

The camera control unit 102 transmits a signal to and from a focus adjustment unit 205 and an aperture drive unit 204 of the lens apparatus 200 via the camera mount unit 120, a lens mount unit 220 and a lens control unit 206 of the lens apparatus 200.

In addition to the ROM and the RAM described above, in the present embodiment, the memory unit 103 includes a storage function of an analog image capturing signal from the image capturing element 101.

The photometry unit 104 acquires an analog image signal output from the image capturing element 101 serving also as a photometry sensor from the memory unit 103 as a luminance signal corresponding to the brightness of the field, performs amplification of the luminance signal, logarithmic compression, A/D conversion, and the like to calculate a subject luminance.

The AF detection unit 105 acquires, from the memory unit 103, signal voltage of analog image signals from a plurality of detection elements (a plurality of pixels) used for phase difference detection, included in the pixels constituting the image capturing element 101, and performs A/D conversion to generate an image signal. Then, the camera control unit 102 acquires the generated image signal from the AF detection unit 105, and calculates the distance to the subject corresponding to each focus detection point. This technique is what is known as on-imaging plane phase difference AF and is a known technique.

The image processing unit 107 performs various types of image processing on image data stored in the RAM included in the memory unit 103. Specifically, the image processing unit 107 performs various types of image processing for developing, displaying, and recording digital image data, such as defect correction processing, demosaicing processing, white balance correction processing, color interpolation processing, and gamma processing of pixels caused by the optical system in the lens apparatus 200 and the image capturing element 101.

The signal input unit 106 includes a release button, and is connected with a switch SW1 (not illustrated) that outputs an on signal in a first stroke (half press) of the release button and a switch SW2 (not illustrated) that outputs an on signal in a second stroke (full press). The on signals from the switches SW1 and SW2 are input to the camera control unit 102. The camera control unit 102 starts operation of photometry and focus detection of the camera body 100 when an on signal is input from the switch SW1, and the camera control unit 102 starts photographing operation when an on signal is input from the switch SW2.

The record/output unit 108 records data including image data into a recording medium such as a removable memory card, and outputs the data to an external apparatus via an external interface.

The LED 109 is an LED built in the camera body 100, and notifies a photographing timing by being lit as AF assist light for illuminating the subject or being blinked/lit as a self-timer lamp at the time of self-timer photographing.

The camera-side ACC connection unit 140 is connected to a strobe-side ACC connection unit 340 described later of the light emission apparatus 300, and transmits, to a strobe control unit 311, an instruction signal from the camera control unit 102. Due to this, the strobe control unit 311 having received the instruction signal controls flash light emission by a flash light emission tube 321 and light emission by an LED 322.

The lens apparatus 200 includes an optical system including a zoom lens 201, a focus lens 202, and an aperture 203, an aperture drive unit 204, a focus adjustment unit 205, the lens control unit 206, and the lens mount unit 220.

The optical system of the lens apparatus 200 guides a light flux from the subject to the image capturing element 101 in a state where the lens apparatus 200 is mounted on the camera body 100, and forms a subject image on the on-imaging plane of the image capturing element 101.

The lens control unit 206 receives an instruction signal from the camera control unit 102 via a mount contact portion not illustrated provided in the lens mount unit 220. The aperture drive unit 204 and the focus adjustment unit 205 are driven and controlled by the lens control unit 206 on the basis of the instruction signal from the camera control unit 102.

Next, the light emission apparatus 300 will be described.

The light emission apparatus 300 roughly includes three parts of a strobe body unit 310, a strobe head unit 320, and a bounce mechanism unit 330.

The strobe body unit 310 stores the strobe control unit 311 that is mounted on a main substrate not illustrated and controls the entire light emission apparatus 300, a strobe operation unit 312 including a power switch, a display unit 313, a power source 314, the strobe-side ACC connection unit 340, and the like.

Upon receiving an instruction from the camera control unit 102 or an instruction from the strobe operation unit 312, the strobe control unit 311 performs light emission control of the flash light emission tube 321 and the LED 322 in the strobe head unit 320.

The bounce mechanism unit 330 stores an irradiation direction change mechanism not illustrated, which is a known mechanism in an external strobe such as the light emission apparatus 300, a main capacitor 331, and the like.

The irradiation direction change mechanism holds the strobe head unit 320 rotatably in the horizontal direction and the vertical direction with respect to the strobe body unit 310. This enables bounce photographing in which the irradiation direction of the flash light emission tube 321 is changed.

The voltage of the power source 314 is boosted to several hundred V by a booster circuit not illustrated, whereby the main capacitor 331 is charged and electric energy is accumulated. A resistor (voltage detection means) not illustrated that detects the voltage of the main capacitor 331 is incorporated in a part of the booster circuit.

The strobe head unit 320 stores the flash light emission tube 321, the LED 322, a temperature sensor 323, and the like necessary for strobe light emission.

The flash light emission tube 321 (flash light emission means) includes a xenon tube or a quartz tube, converts electric energy charged in the main capacitor 331 into light energy according to a light emission signal from the strobe control unit 311, and emits flash light. A reflector and a Fresnel lens that are not illustrated are arranged around the flash light emission tube 321 to adjust light distribution.

In accordance with a light emission signal from the strobe control unit 311, the LED 322 (light emitting means) is lit for the purpose of assisting the photographing of the camera body 100 as a modeling lamp or AF assist light. A lens not illustrated is arranged in front of the LED 322 to adjust the light distribution of the LED 322. As the color temperature of the LED 322 in the present embodiment, any in a range of 3000 to 6500 K is used. The light emission amount of the LED 322 is controlled using PWM control. A table of the light emission amount and the duty ratio of the PWM control is recorded in a non-volatile memory not illustrated such as an EEPROM present inside the strobe control unit 311.

In order to predict the internal temperature of the LED 322, the temperature sensor 323 (temperature detection means) is arranged in a vicinity of the LED 322 on a substrate not illustrated on which the LED 322 is mounted, and measures the temperature in the vicinity of the LED 322. The temperature sensor 323 outputs a measurement result to the strobe control unit 311 as temperature information. The strobe control unit 311 restricts the operation of the LED 322 on the basis of the temperature information acquired from the temperature sensor 323 to prevent the LED 322 from being overheated beyond the rated temperature and destroyed.

In the present embodiment, the LED 322 is mounted on the strobe head unit 320, but may be mounted at another position in the light emission apparatus 300 as long as the light emission direction is substantially the same as the light emission direction of the flash light emission tube 321. For example, the LED 322 may be mounted on the waist of the strobe body unit 310. In that case, the usage becomes from modeling lamp to video light. Also in this case, the LED 322 remains usable as the AF assist light.

The above is the explanation on the basic configuration of the camera system 1 including the camera body 100, the lens apparatus 200, and the light emission apparatus 300.

Hereinafter, the operation of the camera system 1 of the present embodiment will be described with reference to FIGS. 2 to 7C.

Figure 2:
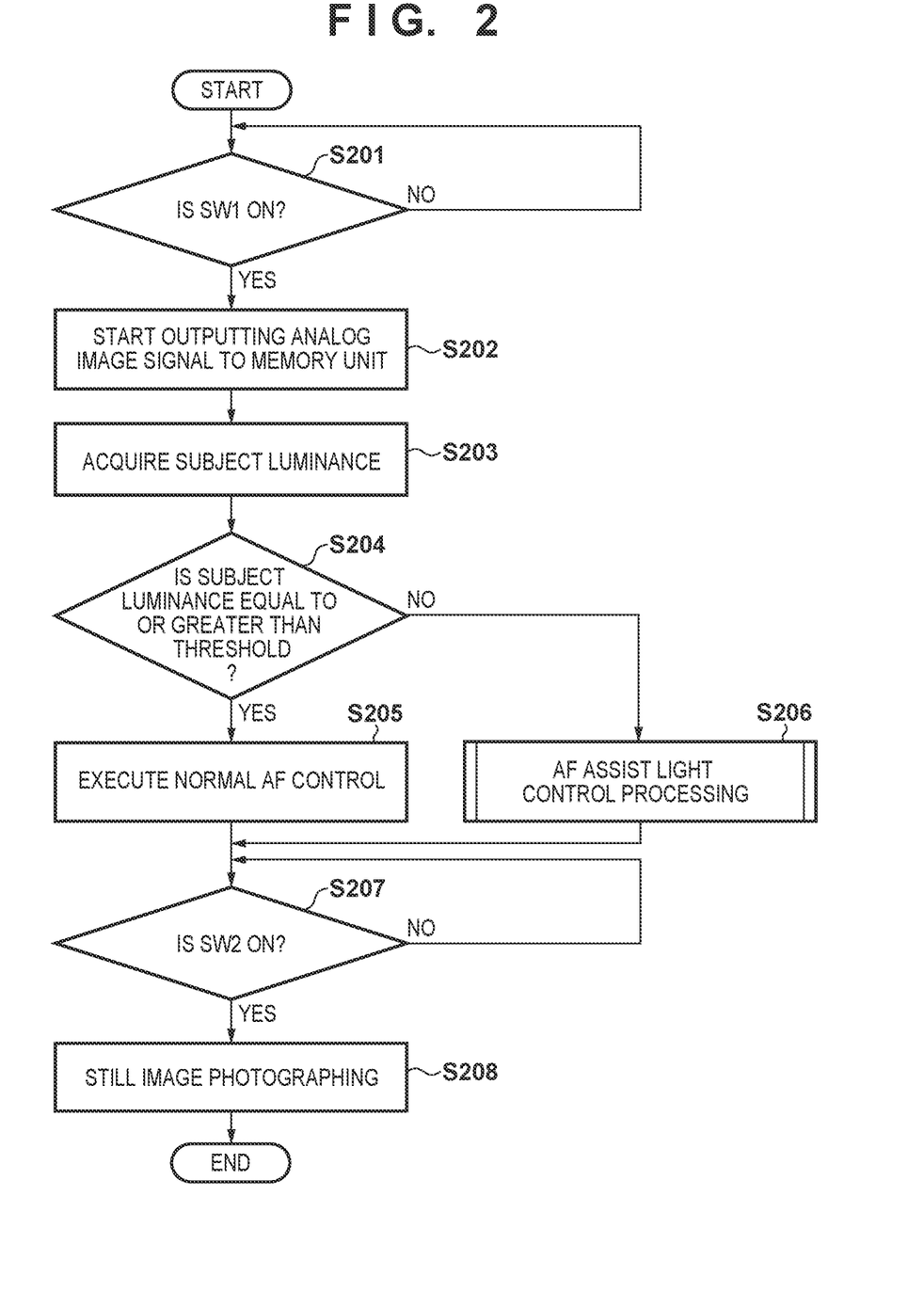
FIG. 2 is a flowchart showing an image capturing operation of the camera system.

FIG. 2 is a flowchart of AF control processing.

First, in step S201, the camera control unit 102 determines whether or not the user performs an operation of the first stroke (half press) on the signal input unit 106 of the camera body 100, and an on signal of the switch SW1 has been output. When the on signal of the switch SW1 is output, the camera control unit 102 proceeds with the processing to step S202 to start the AF control operation, and otherwise, stands by as it is.

In step S202, the camera control unit 102 starts outputting, to the memory unit 103, an analog image signal from the image capturing element 101.

In step S203, the camera control unit 102 acquires, from the photometry unit 104, subject luminance calculated from the analog image signal of the memory unit 103.

In step S204, the camera control unit 102 determines whether or not the subject luminance acquired in step S203 is equal to or greater than a threshold. The camera control unit 102 proceeds with the processing to step S205 when determining that the subject luminance is equal to or greater than the threshold (YES in step S204), and proceeds with the processing to step S206 when determining that the subject luminance is less than the threshold (NO in step S204).

In step S205, the camera control unit 102 executes normal AF control. Upon completing the execution of the normal AF control, the camera control unit 102 proceeds with the processing to step S207. Note that the normal AF control is similar to a known AF control in which the LED 322 is not used for the assist light, and therefore description of specific control content will be omitted.

In step S206, the camera control unit 102 executes AF assist light control processing of lighting the LED 322 as assist light to perform AF control. Note that although details of the AF assist light control processing will be described later, not only the camera control unit 102 but also the strobe control unit 311 actually executes the processing in cooperation. Upon completing the AF assist light control processing, the camera control unit 102 proceeds with the processing to step S207.

In step S207, the camera control unit 102 determines whether or not the user performs an operation of the second stroke (full press) on the signal input unit 106 of the camera body 100, and an on signal from the switch SW2 has been output. When the on signal of the switch SW2 is output, the camera control unit 102 proceeds with the processing to step S208, and otherwise, stands by as it is.

In step S208, still image photographing is executed, and the processing of the present flowchart is ended.

Figure 3:
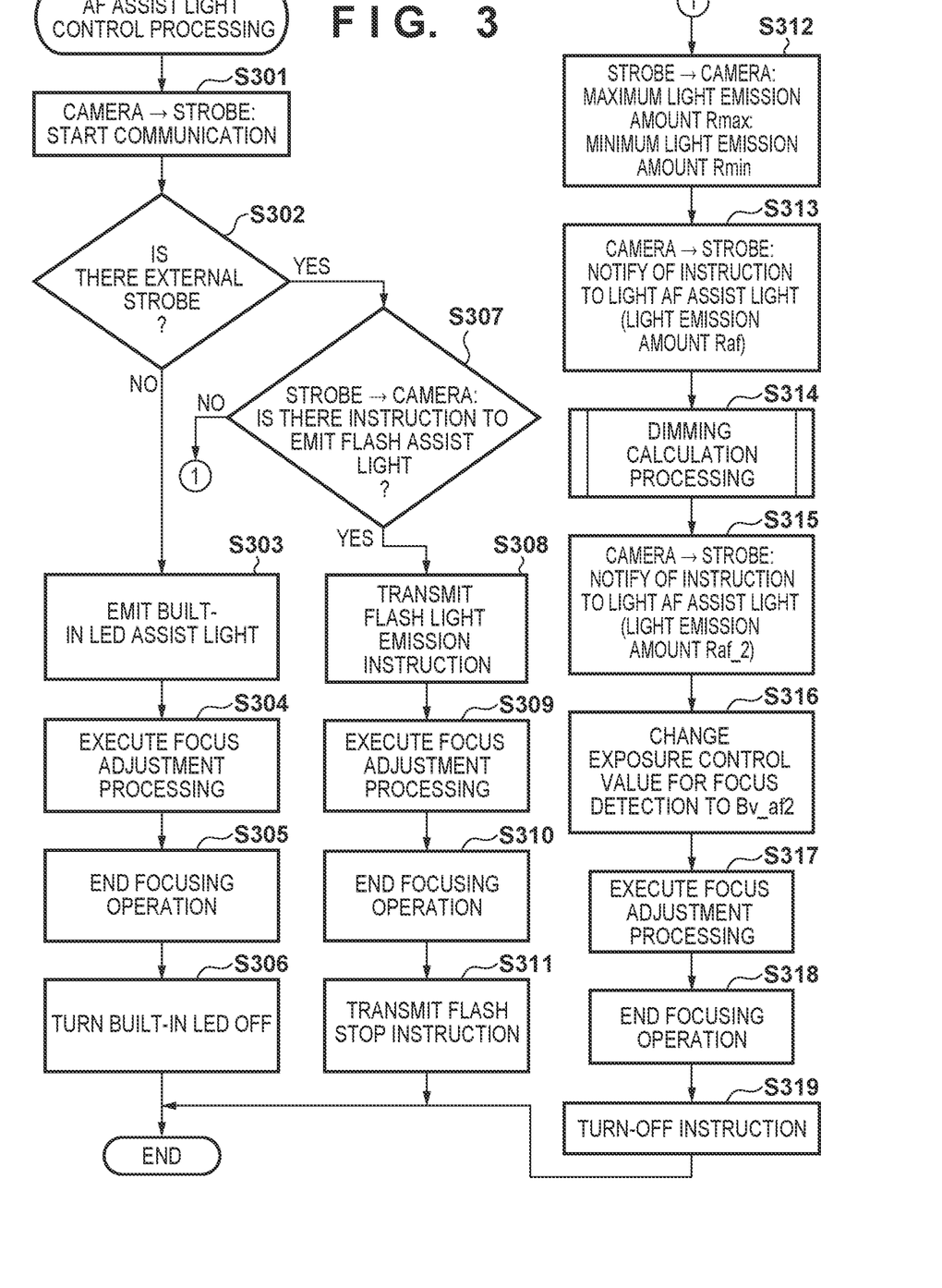
FIG. 3 is a flowchart showing an operation of AF assist light control processing.

FIG. 3 is a flowchart showing the operation of the AF assist light control processing in step S206 of FIG. 2. The operation of the flowchart of FIG. 3 is implemented by the camera control unit 102 developing a control program stored in the ROM included in the memory unit 103 into the RAM included the memory unit 103 and executing the control program. The operation of each flowchart used in the following description is similarly implemented.

First, in step S301, the camera control unit 102 starts communication between the camera body 100 and the light emission apparatus 300 via the camera-side ACC connection unit 140.

In step S302, the camera control unit 102 determines whether or not the light emission apparatus 300, which is an external strobe, is connected to the camera body 100. The camera control unit 102 proceeds with the processing to step S303 when the light emission apparatus 300 is not connected (NO in step S302), and proceeds with the processing to step S307 when the light emission apparatus 300 is connected (YES in step S302).

In step S303, the camera control unit 102 lights, as AF assist light, the LED 109 of the camera body 100 with a fixed light amount.

In step S304, the camera control unit 102 performs focus adjustment processing while the LED 109 is lit with the fixed light amount as AF assist light. Specifically, first, an instruction is given to the AF detection unit 105 to acquire, from the memory unit 103, the analog image signal output from the image capturing element 101 after the lighting of the LED 109 is started in step S303, and to generate an image signal used for phase difference detection. Next, AF information is calculated from the image signal generated by the AF detection unit 105. Specifically, a defocus distance (defocus amount) to the subject is calculated, and contrast, reliability, and the like are calculated. Thereafter, based on these calculation results, an instruction is given to the lens control unit 206 to drive the focus adjustment unit 205 to move the focus lens 202 to an in-focus position. Note that in a case where the defocus amount cannot be calculated, the focus lens 202 is subjected to search drive to move to a position where the defocus amount can be calculated.

In step S305, when the focus lens 202 moves to the in-focus position, the camera control unit 102 ends the focusing operation. In a case where the defocus amount cannot be calculated even if the entire focus region is moved by the search drive in step S304, the focusing operation is ended as out of focus.

In step S306, the camera control unit 102 turns the LED 109 off and ends the processing of the present flowchart.

In step S307, the camera control unit 102 determines whether or not there is an instruction to emit the flash assist light. Specifically, when the temperature sensor 323 arranged in the vicinity of the LED 322 is equal to or higher than a predetermined temperature, there is a possibility that the LED 322 is overheated beyond the rated temperature and destroyed. Therefore, in place of lighting the LED 322, an instruction to light the flash AF assist light by the flash light emission tube 321 is transmitted to the camera control unit 102.

The camera control unit 102 proceeds with the processing to step S308 when there is an instruction to emit the flash assist light (YES in step S307), and proceeds with the processing to step S312 when there is no instruction to emit the flash assist light (NO in step S307).

In step S308, the camera control unit 102 transmits, to the strobe control unit 311, an instruction (flash light emission instruction) to cause the flash light emission tube 321 to start intermittent light emission as AF assist light (hereinafter, called light emission of flash AF assist light). Since the light emission of the flash AF assist light is a known technique, a detailed description thereof will be omitted here.

In step S309, the camera control unit 102 performs focus adjustment processing similar to that in step S305 while the flash light emission tube 321 intermittently emits light as AF assist light.

In step S310, the camera control unit 102 ends the focusing operation by the similar processing to that in step S305.

In step S311, after transmitting an instruction to stop light emission of the flash AF assist light (flash stop instruction) to the strobe control unit 311, the camera control unit 102 ends the processing of the present flowchart.

Next, an explanation will be given regarding a case where in steps S312 to S318, in the light emission apparatus 300, not the flash light emission tube 321 but the LED 322 is caused to emit the AF assist light.

In step S312, the camera control unit 102 communicates with the strobe control unit 311 of the light emission apparatus 300, and receives a maximum light emission amount (upper limit value of the light emission amount) Rmax and a minimum light emission amount (lower limit value of the light emission amount) Rmin of the LED 322. Here, the maximum light emission amount Rmax and the minimum light emission amount Rmin are held in a ROM not illustrated present in the strobe body unit 310.

In step S313, the camera control unit 102 notifies the strobe control unit 311 of an instruction to light the AF assist light with a light emission amount Raf.

Here, the light emission amount Raf of AF assist light by the LED 322 will be described. The light emission amount Raf is determined according to the light collection ability of the lens apparatus 200, that is, the opening amount of the aperture 203 at the time of AF. The opening amount of the aperture 203 at the time of AF is set to an opening F value of the lens apparatus 200, which is different from that at the time of photographing. This is because high AF performance, that is, focusing accuracy and responsiveness are maintained by taking in a larger light amount at the time of AF.

Figure 4:
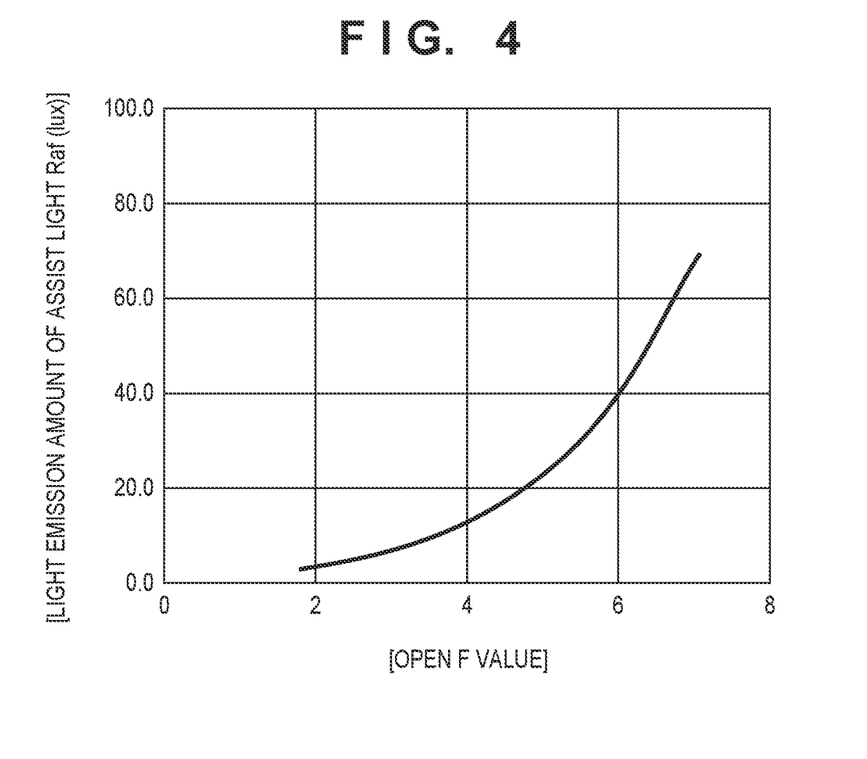
FIG. 4 is a graph showing a relationship between a lens aperture value and a light emission amount of AF assist light.

FIG. 4 is a graph showing the relationship between the open F value of the lens apparatus 200 (lens aperture value at the time of AF) and the light emission amount Raf of AF assist light.

FIG. 4 shows the light emission amount in a case where exposure (ISO, Tv) of the camera body 100 at the time of AF is fixed and then a chart at a distance defined in the standard is focused. The smaller the value of the aperture 203, the closer to the opening, and the higher the light collection ability, and therefore a light amount sufficient for performing AF can be taken in even if the amount of assist light is small. Therefore, it is possible to prevent the subject from feeling dazzled.

Note that, here, the light emission amount is determined according to the value of the aperture 203, but may be determined according to the focal length of the lens apparatus 200. The light emission amount Raf of the AF assist light is basically determined based on the open F value of the lens apparatus 200 shown in the graph of FIG. 4, but may be changed depending on the bounce state of the light emission apparatus 300 or the like. When Raf is out of the range of Rmax and Rmin, the value of Raf is changed so as to fall within the range of Rmax and Rmin.

Next, in step S314, the camera control unit 102 performs dimming calculation processing.

In the dimming calculation processing, in a case where light is emitted with the light emission amount Raf (Raf1), the light emission amount is not necessarily the optimum light emission amount depending on conditions such as the distance to the subject and contrast. Therefore, a light emission amount (Raf2) of the LED 322 and an exposure control value (shutter speed, ISO sensitivity) for focus detection are calculated. Details of the dimming calculation processing will be described later with reference to FIG. 5.

In step S315, the camera control unit 102 notifies the strobe control unit 311 of an instruction to light the AF assist light with the light emission amount Raf2, and changes the light emission amount. In a case where the light emission amount Raf2 is not different from the light emission amount Raf1, this processing can be omitted.

In step S316, the camera control unit 102 changes the exposure control value for focus detection to Bv_af2. The exposure control value Bv_af2 will be described later. In a case where the light emission amount changes due to dimming, it is necessary to properly expose the subject according to the exposure control value (shutter speed, ISO sensitivity), and therefore, the exposure control value also needs to be changed in accordance with dimming. In a case where there is no change in the exposure control value, this processing can be omitted.

In steps S317 and S318, the camera control unit 102 performs processing similar to those in steps S305 and S306.

In step S319, the camera control unit 102 outputs a turn-off instruction of the LED 322 to the strobe control unit 311, and ends the processing of the present flowchart.

Now, when the lighting processing of the AF assist light executed on the camera body 100 side ends, the camera control unit 102 proceeds with the processing to step S207, returning to FIG. 2.

Figure 5:
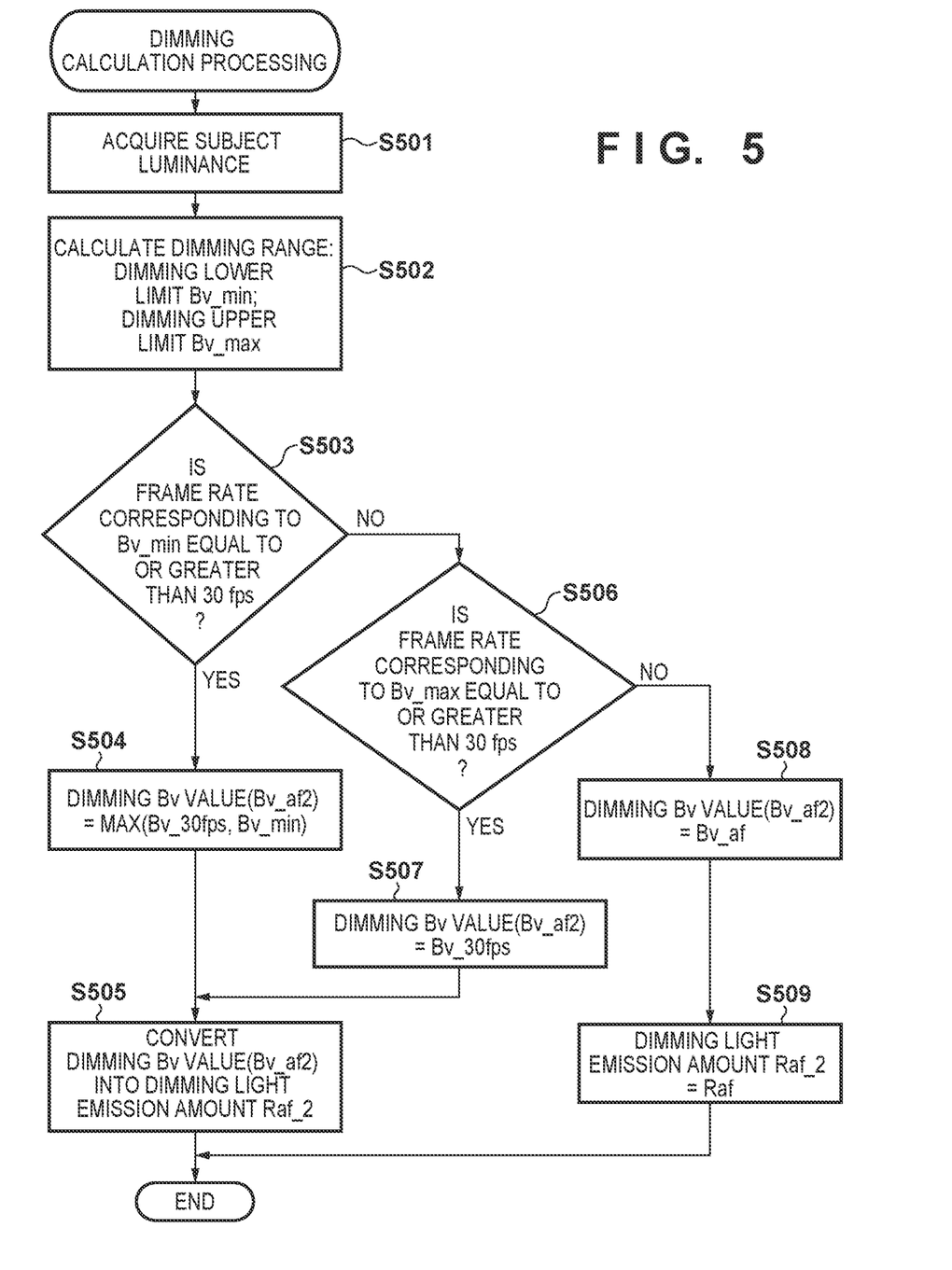
FIG. 5 is a flowchart showing an operation of dimming calculation processing in a first embodiment.

FIG. 5 is a flowchart showing the operation of the dimming calculation processing in step S314 of FIG. 3.

First, in step S501, the camera control unit 102 acquires, from the photometry unit 104, the subject luminance calculated from the analog image signal output from the image capturing element 101 after the lighting of the AF assist light instructed in step S313 is started. The subject luminance may be calculated from a range limited to a focus detection region, or may be calculated from the entire image.

In step S502, as the dimming range for the maximum light emission amount Rmax and the minimum light emission amount Rmin, the camera control unit 102 calculates a dimming upper limit exposure control value Bv_max and a dimming lower limit exposure control value Bv_min. Bv_max is an exposure control value where the subject is properly exposed when the light emission amount is changed to Rmax, and Bv_min is an exposure control value where the subject is properly exposed when the light emission amount is changed to Rmin.

In a case where the photometry value in a state of not performing LED light emission acquired in step S203 is BV_n, and the photometry value in a state of performing LED light emission with the light emission amount Raf acquired in step S501 is BV_af, the dimming upper limit exposure control value Bv_max and the dimming lower limit exposure control value Bv_min are calculated by the following Expressions (1) and (2).

$$Bv\_max = BV\_n + (R\,max/Raf) \times (BV\_af - BV\_n) \quad (1)$$

$$Bv\_min = BV\_n + (R\,min/Raf) \times (BV\_af - BV\_n) \quad (2)$$

Expressions (1) and (2) show a case where the photometry value has a linear scale, but the photometric information often has a logarithmic scale. The exposure control value is only required to be appropriately calculated using a table storing conversion between the linear scale and the logarithmic scale.

In step S503, the camera control unit 102 determines whether or not the frame rate (cycle of image, period of focus detection) corresponding to Bv_min is equal to or greater than 30 fps. Here, FIG. 6 illustrates a program diagram of exposure control during control of AF assist light.

Figure 6:
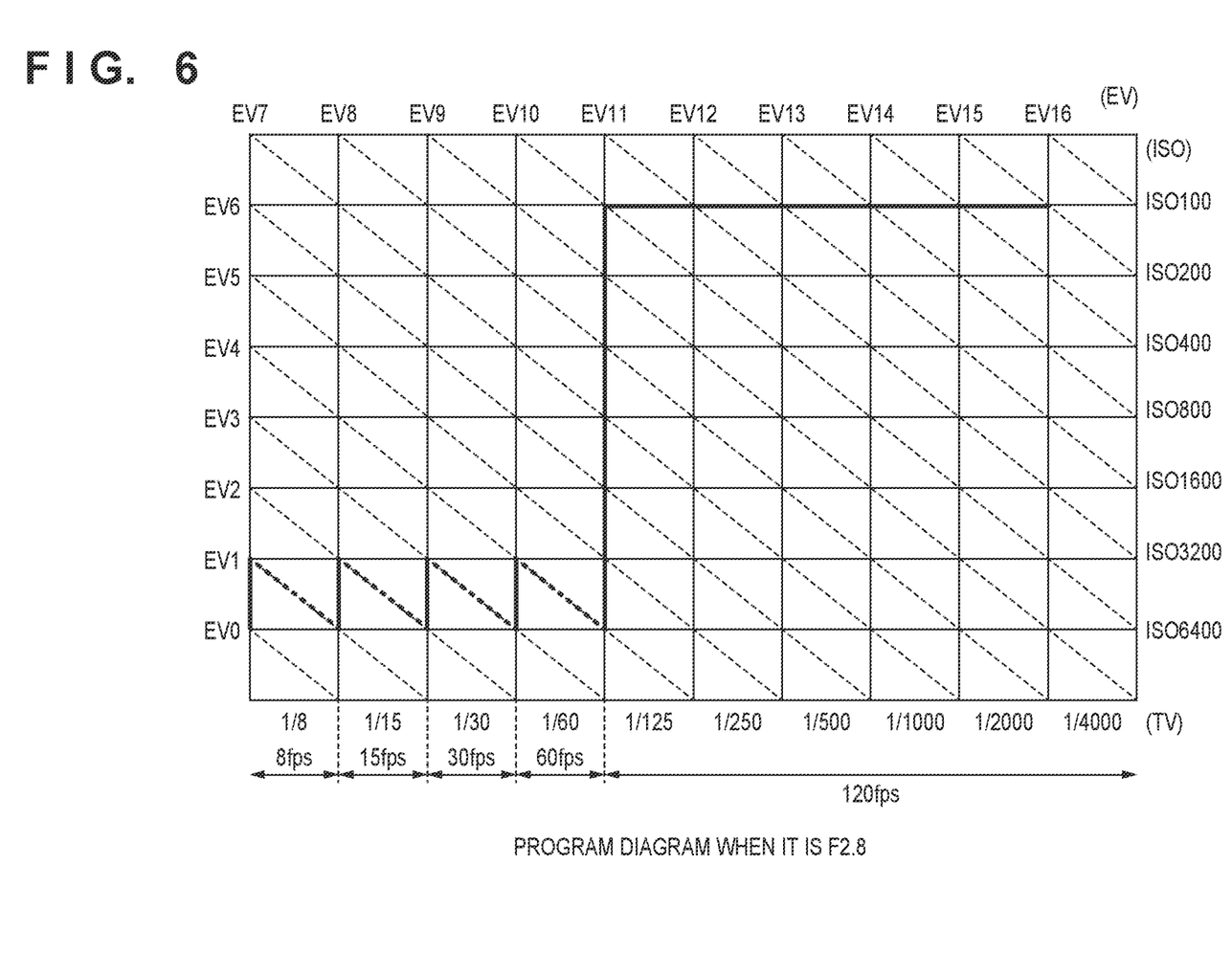
FIG. 6 is a program diagram of exposure control during AF assist light control.

FIG. 6 illustrates a program diagram in a case of F2.8, but the shape of the program diagram is the same regardless of the F value. The program diagram is not limited to this shape.

In the program diagram of FIG. 6, the frame rate is controlled at 120 fps on the side where a TV value has seconds shorter than 1/125 (seconds), and changes to 60 fps, 30 fps, 15 fps, and 8 fps as the TV value has longer seconds. The higher the frame rate at the time of AF is, the higher the lens speed can be, and therefore the AF time can be shortened. Therefore, in a case where the light emission amount of the LED is reduced, the AF time can be suppressed from being delayed as long as the exposure control value can cope with a frame rate higher than a predetermined frame rate.

In the present embodiment, it is assumed that the AF time can be suppressed from being delayed as long as the frame rate is higher than 30 fps, but the threshold of the frame rate may be arbitrarily set.

The camera control unit 102 proceeds with the processing to step S504 when determining in step S503 that the frame rate corresponding to Bv_min is equal to or greater than 30 fps (equal to or greater than a predetermined value), and otherwise, proceeds with the processing to step S506.

In step S504, the camera control unit 102 sets MAX (Bv_30 fps, Bv_mini) to a dimming By value Bv_af2, which is an exposure control value after dimming. MAX (Bv_30 fps, Bv_mini) is a larger value of either Bv_30 fps or Bv_mini.

Figure 7A:
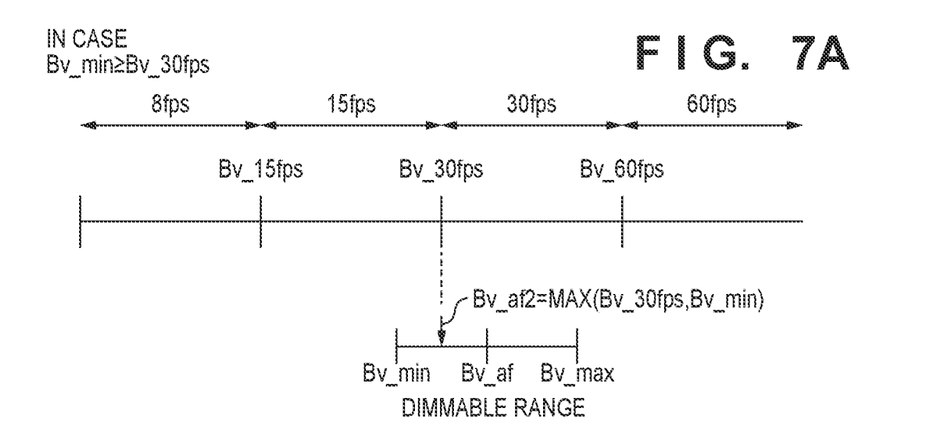
FIGS. 7A to 7C are views illustrating a relationship between a dimmable range and a frame rate.

The relationship between Bv_af2 and Bv_30 fps in this case is illustrated in FIG. 7A.

Bv_30 fps corresponds to a luminance threshold (predetermined value) at which the frame rate can be set to 30 fps. In a case where this Bv_30 fps is included in the dimmable range, Bv_30 fps is set to Bv_af2, and in a case where By fps is not included, Bv_mini is set to Bv_af2.

The reason for this is that if Bv_af2 is set to Bv_min, the frame rate is lowered and the AF time is delayed. In this manner, the light emission amount is reduced within a range where the frame rate is not lowered.

In step S505, the dimming BV value Bv_af2 is converted into a dimming light emission amount Raf_2. Raf_2 is calculated by Expression (3).

$$Raf\_2 = Raf \times (BV\_af2 - BV\_n)/(BV\_af - BV\_n) \quad (3)$$

Expression (3) shows a case where the photometry value has a linear scale, but the photometric information often has a logarithmic scale. The dimming light emission amount is only required to be appropriately calculated using a table storing conversion between the linear scale and the logarithmic scale.

Now, the dimming calculation processing in a case where the frame rate corresponding to Bv_min is determined to be equal to or greater than 30 fps is ended.

In step S506, the camera control unit 102 determines whether or not the frame rate corresponding to Bv_max is equal to or greater than 30 fps. The camera control unit 102 proceeds with the processing to step S507 when determining that the frame rate corresponding to Bv_max is equal to or greater than 30 fps, and otherwise, proceeds with the processing to step S508.

In step S507, the camera control unit 102 sets Bv_30 fps as the dimming BV value Bv_af2. The relationship between Bv_af2 and Bv_30 fps in this case is illustrated in FIG. 7B.

The reason for setting the dimming BV_af2 to not Bv_max but Bv_30 fps is that setting to Bv_max results in too much increase of the light emission amount, and the subject may feel dazzled. By suppressing the frame rate to Bv_30 fps exceeding 30 fps, it is possible to suppress dazzle.

Figure 7B:
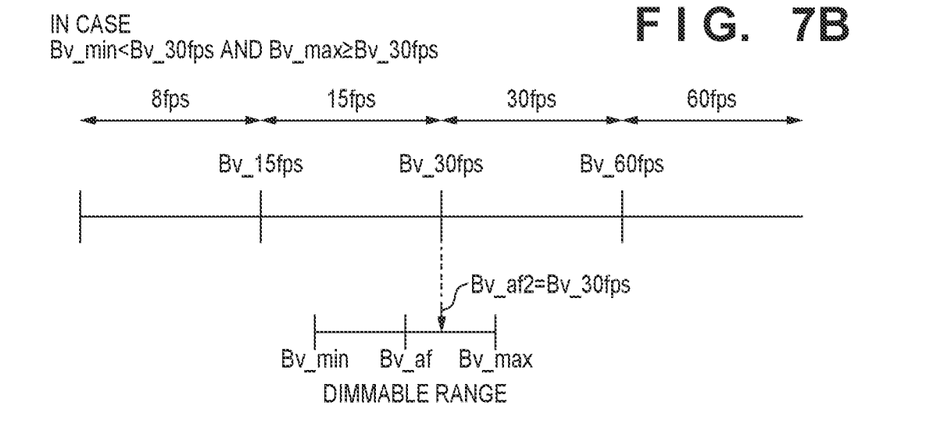

Note that, putting together the relationships of FIG. 7A and FIG. 7B, in a case where the luminance Bv_af of the subject of the case where the light emission amount of the LED 322 is Raf is equal to or greater than Bv_30 fps (equal to or greater than the predetermined value), the light emission amount of the LED 322 is controlled to become equal to or less than Raf (equal to or less than the first light emission amount). In a case where the luminance Bv_af of the subject of the case where the light emission amount of the LED 322 is Raf is less than Bv_30 fps (less than the predetermined value), the light emission amount of the LED 322 is controlled to become greater than Raf (first light emission amount).

Thereafter, the camera control unit 102 performs processing of converting the dimming BV value Bv_af2 into the dimming light emission amount Raf_2 in step S505, and ends the dimming calculation processing.

In the above description, the case where the frame rate corresponding to Bv_max is equal to or greater than 30 fps has been described as an example, but the threshold is not limited to 30 fps. In a case where the frame rate corresponding to Bv_max becomes higher than the frame rate corresponding to Bv_af, similar control may be performed.

Figure 7C:
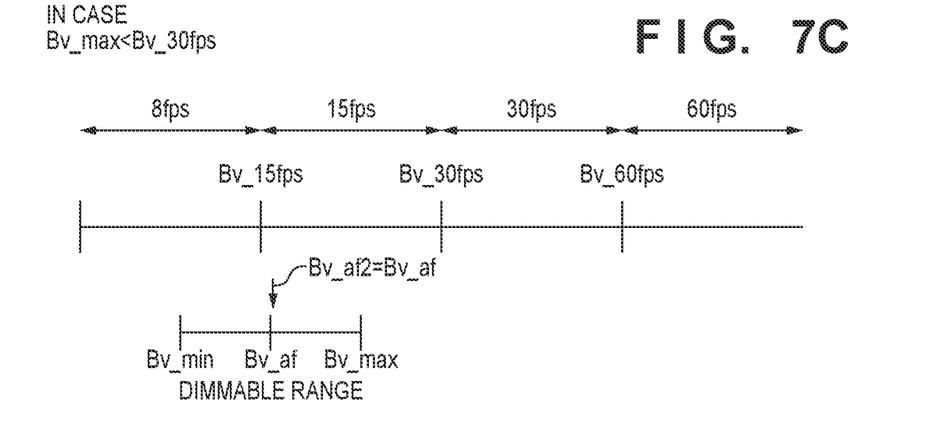

In step S508, the camera control unit 102 sets Bv_af as the exposure control value, and in step S509, sets Raf as the dimming light emission amount Raf2. The relationship between Bv_af2 and Bv_30 fps in this case is illustrated in FIG. 7C.

In this case, since the frame rate cannot be set to 30 fps even when Bv_max is set, increasing of the light emission amount is not performed. In step S509, since the light emission amount of the LED does not change, Bv_af may be used as it is as the exposure control value.

The series of dimming calculation processing is ended now.

According to the present embodiment, at the time of controlling the AF assist light, it is possible to reduce dazzle due to the AF assist light to suppress discomfort and to suppress the AF time from increasing.

Second Embodiment

Hereinafter, the second embodiment of the present invention will be described. Since the basic configuration is the same as that of the first embodiment, different parts will be described below. In the present embodiment, the operation of the dimming calculation processing of step S314 in FIG. 3 is different from that of the first embodiment.

Figure 8A:
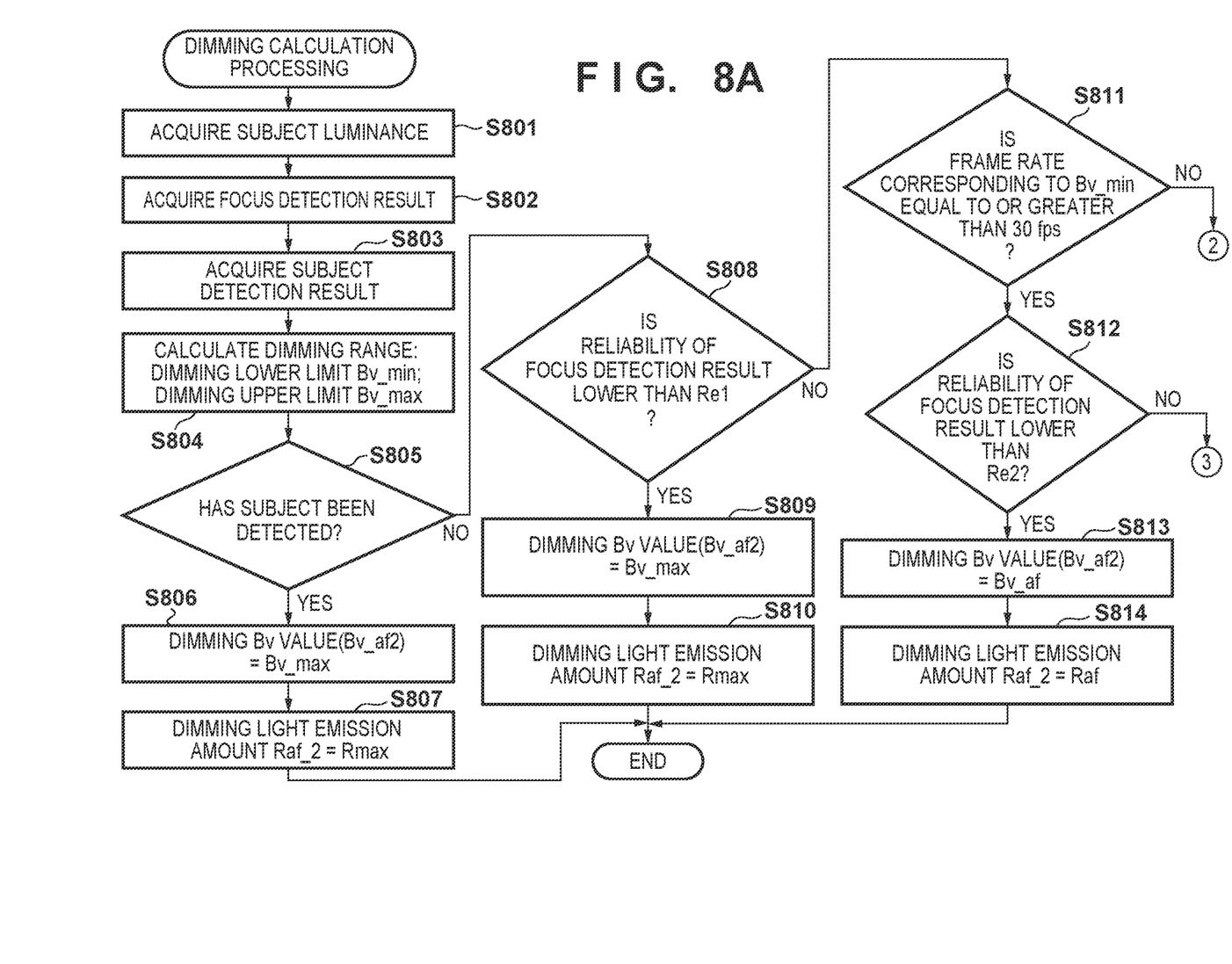
FIGS. 8A and 8B are flowcharts showing an operation of dimming calculation processing in a second embodiment.
Figure 8B:
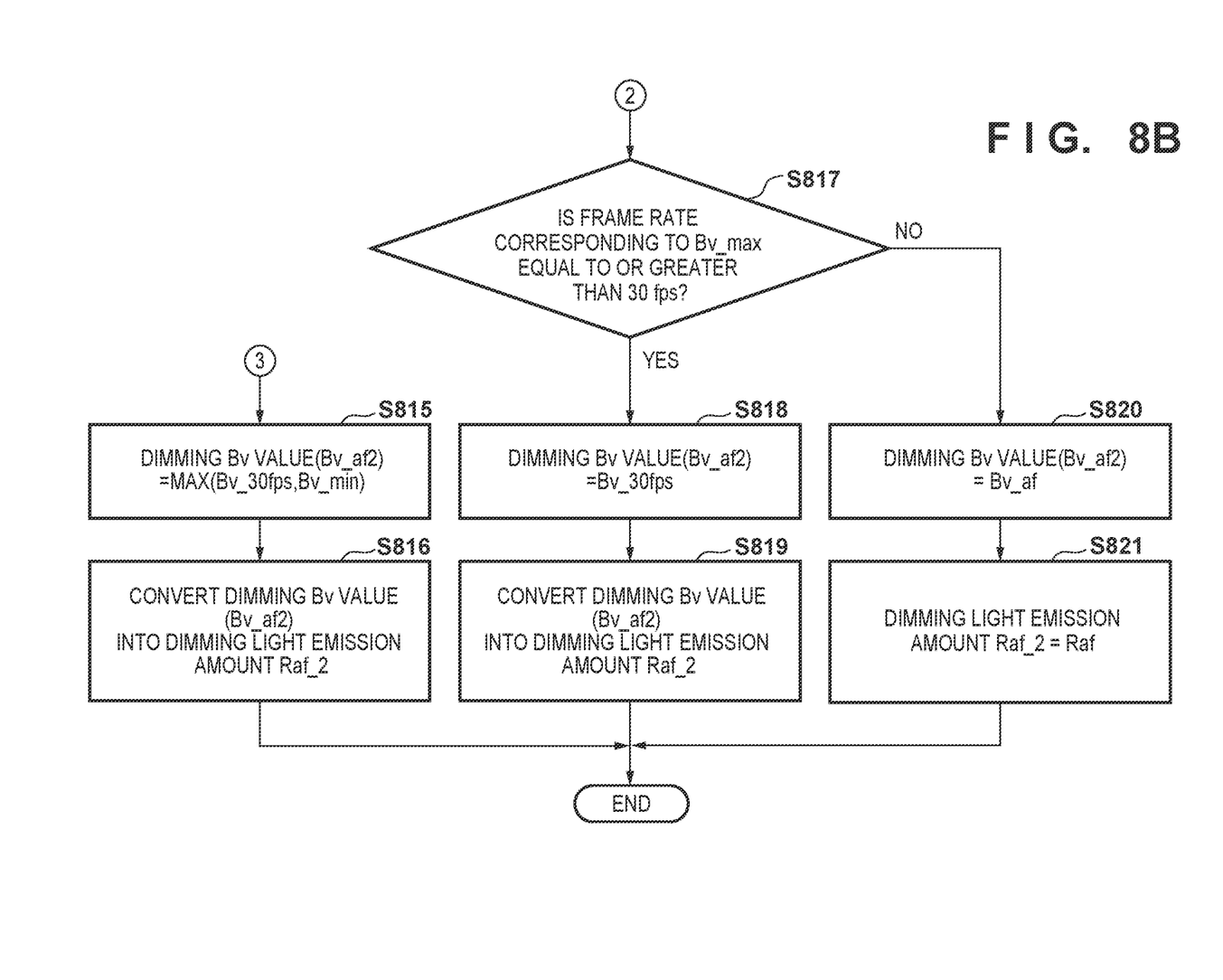

FIGS. 8A and 8B are flowcharts showing the dimming calculation processing in step S314 in the present embodiment.

First, in step S801, the camera control unit 102 acquires, from the photometry unit 104, the subject luminance calculated from the analog image signal output from the image capturing element 101 after the lighting of the AF assist light instructed in step S313 is started.

In step S802, the camera control unit 102 acquires, from the AF detection unit 105, the focus detection result calculated from the analog image signal output from the image capturing element 101 after the lighting of the AF assist light instructed in step S313 is started.

Figure 9:
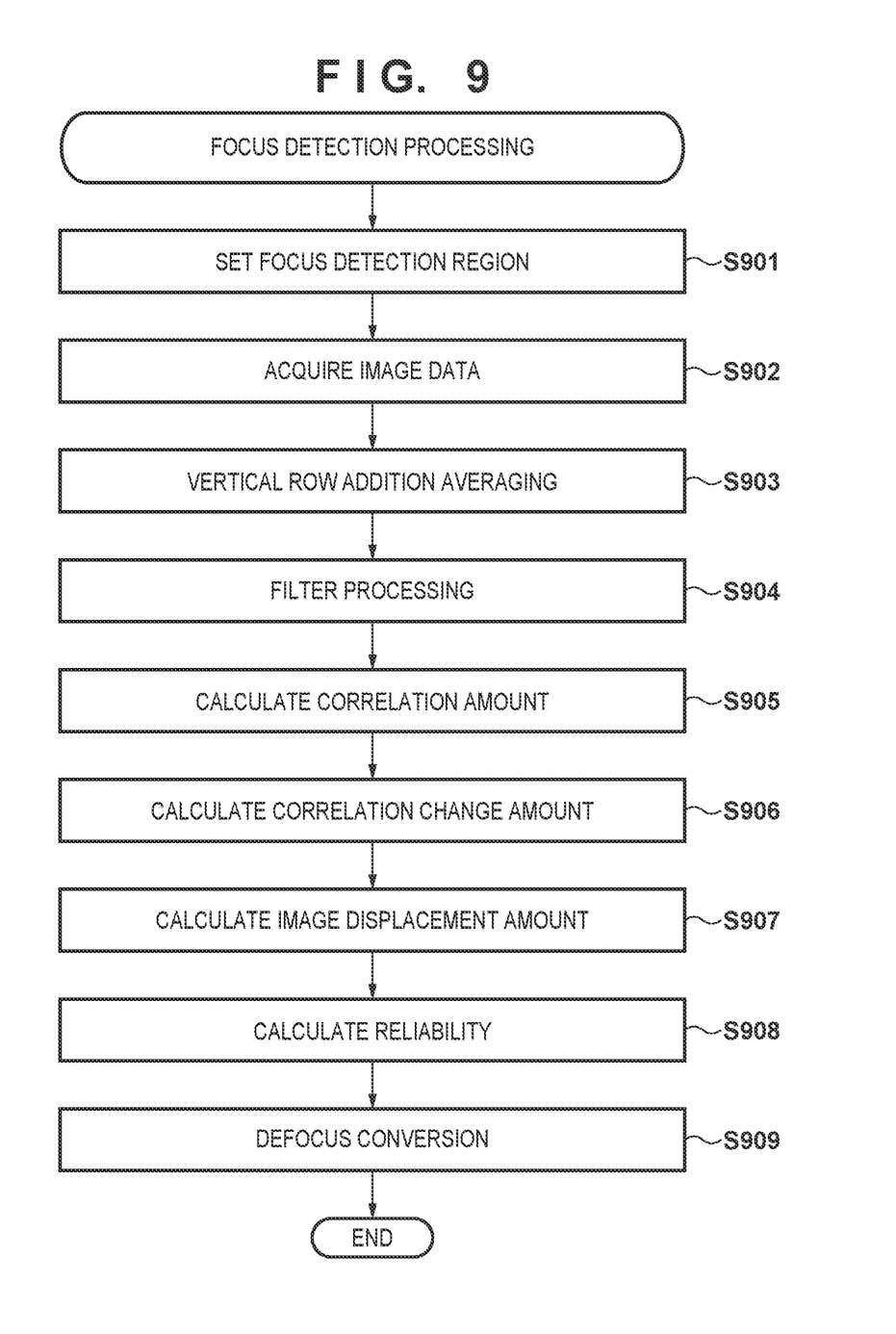
FIG. 9 is a flowchart showing an operation of focus detection processing.

The focus detection processing will be described with reference to FIG. 9.

First, in step S901, the camera control unit 102 sets a focus detection region in an arbitrary range in the image capturing element 101, and proceeds with the processing to step S902.

In step S902, the camera control unit 102 acquires a pair of image signals (an image A and an image B) for focus detection from the image capturing element 101 with respect to the focus detection region set in step S901, and proceeds with the processing to step S903.

In step S903, the camera control unit 102 performs processing in which the pair of signals acquired in step S902 are subjected to addition averaging in the vertical row direction, before proceeding with the processing to step S904. This processing can reduce the influence of noise of the image signal.

In step S904, the camera control unit 102 performs filter processing in which a signal component in a predetermined frequency band is extracted from the signal obtained by the vertical row addition averaging in step S903, before proceeding with the processing to step S905.

In step S905, the camera control unit 102 calculates a correlation amount from the signal subjected to the filter processing in step S904, and proceeds with the processing to step S906.

In step S906, the camera control unit 102 calculates a correlation change amount from the correlation amount calculated in step S905, and proceeds with the processing to step S907.

In step S907, the camera control unit 102 calculates an image displacement amount from the correlation change amount calculated in step S905, and proceeds with the processing to step S908.

In step S908, the camera control unit 102 calculates a reliability indicating how reliable the image displacement amount calculated in step S907 is, and proceeds with the processing to step S909.

In step S909, the camera control unit 102 converts the image displacement amount into a defocus amount, and ends the focus detection processing.

Here, the reliability calculated in step S908 is a value serving as an index indicating the accuracy variation of the defocus amount. The higher the reliability is, the better the focusing accuracy is. The reliability is used to determine focusing in a case where the accuracy variation of the defocus amount is within a predetermined range (for example, within the depth of focus).

In step S803, the camera control unit 102 acquires, from the image processing unit 107, the subject detection result calculated from the analog image signal output from the image capturing element 101 after the lighting of the AF assist light instructed in step S313 is started.

In the present embodiment, it is assumed to detect, as a subject, a person, an animal such as a dog or a wild bird, and a main region in the subject. The main region is a pupil, a face, or a body of a person or an animal. These detection methods use a learning method by deep learning, an image processing method, and the like, which are known techniques. Since these methods are not main parts in carrying out the present invention, detailed description thereof will be omitted here.

In step S804, similarly to step S502, the camera control unit 102 calculates the dimming upper limit exposure control value Bv_max and the dimming lower limit exposure control value Bv_min.

In step S805, the camera control unit 102 determines whether or not the subject has been detected in step S803. The camera control unit 102 proceeds with the processing to step S806 when the subject has not been detected, and proceeds with the processing to step S808 when the subject has been detected.

In step S806, the camera control unit 102 sets Bv_max to the dimming By value Bv_af2. Furthermore, in step S807, Rmax is set to the light emission amount Raf_2.

The reason for this is that there is no need to suppress dazzle when the subject has not been detected. Increasing the light emission amount increases the frame rate, and may shorten the AF time.

In step 808, the camera control unit 102 determines whether or not the reliability of the focus detection result acquired in step S802 is lower than a predetermined value Re1. A threshold for determining that the accuracy variation of the defocus amount is too low to be determined as focusing is set as Re1. The camera control unit 102 proceeds with the processing to step S809 when the reliability is lower than the predetermined value Re1, and otherwise, proceeds with the processing to step S811.

In step S809, the camera control unit 102 sets Bv_max to the dimming By value Bv_af2. Furthermore, in step S810, Rmax is set to the light emission amount Raf_2.

The reason for this is that in the case where the reliability of the focus detection result is too low to be determined as focusing, there is a possibility that increasing the light emission amount lowers the ISO sensitivity of the exposure control value, improves the S/N of the signal, and improves the reliability of the focus detection result.

In step S811, the camera control unit 102 determines whether or not the frame rate corresponding to Bv_min is equal to or greater than 30 fps. The camera control unit 102 proceeds with the processing to step S812 when the frame rate is equal to or greater than 30 fps, and otherwise, proceeds with the processing to step S817.

In step S812, the camera control unit 102 determines whether or not the reliability of the focus detection result acquired in step S802 is lower than a predetermined value Re2. A threshold for determining that there is a certain level or more of accuracy variation of the defocus amount although the reliability is higher than that of Re1 is set as Re2. The camera control unit 102 proceeds with the processing to step S813 when the reliability is lower than the predetermined value Re2, and otherwise, proceeds with the processing to step S815.

In step S813, the camera control unit 102 sets Bv_af as the exposure control value. Furthermore, in step S814, Raf is set as the dimming light emission amount Raf2, and the light emission amount is not changed.

The reason for this is that in a case where the reliability of the focus detection result is low and the accuracy variation of the defocus amount is large, there is a possibility that when the light emission amount is lowered, the ISO sensitivity of the exposure control value increases, S/N of the analog image signal deteriorates, and the reliability of the focus detection result becomes too low to perform focusing.

Since the processing of steps S815 to S821 is common to that in steps S504 to S509 of the first embodiment, the description thereof will be omitted.

As described above, according to the present embodiment, when controlling the AF assist light, it is possible to optimally control the light emission amount of the AF assist light according to the subject detection state and the focus detection state. This makes it possible to reduce dazzle on the subject side and suppress discomfort under necessary conditions, and possible to suppress the AF time from increasing.

Note that in the present embodiment, the configuration where the light emission amount is changed using the LED 322 included in the light emission apparatus (external strobe) 300 has been described, but the configuration where the light emission amount of the LED 109 built in the camera body 100 is changed may be adopted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-137105, filed Aug. 30, 2022, which is hereby incorporated by reference herein in its entirety.

What is claimed is:

1. An image capturing apparatus comprising:
at least one processor or circuit configured to function as:
a photometry unit that performs photometry of a subject;
a focus detection unit that receives light from a subject and performs focus detection; and
a control unit that controls an assist light device that emits assist light that illuminates a subject,
wherein, based on an output of the photometry unit, the control unit controls a light emission amount of the assist light device in such a manner that a cycle of focus detection according to a time required for the focus detection unit to perform focus detection becomes faster than a predetermined cycle.

2. The image capturing apparatus according to claim 1, wherein the control unit acquires an upper limit value and a lower limit value of a light emission amount of the assist light device, and controls the light emission amount of the assist light device between the upper limit value and the lower limit value.

3. The image capturing apparatus according to claim 2, wherein the control unit causes the assist light device to emit light with a second light emission amount based on an output of the photometry unit when causing the assist light device to emit light with a first light emission amount.

4. The image capturing apparatus according to claim 3, wherein the control unit controls the cycle of the focus detection to become faster than the predetermined cycle by causing the assist light device to emit light with the second light emission amount.

5. The image capturing apparatus according to claim 3, wherein the control unit controls the second light emission amount to become equal to or less than the first light emission amount in a case where an output of the photometry unit when caused to emit light with the first light emission amount is equal to or greater than a predetermined value, and controls the second light emission amount to become larger than the first light emission amount in a case where an output of the photometry unit when caused to emit light with the first light emission amount is less than the predetermined value.

6. The image capturing apparatus according to claim 3, wherein the control unit determines the first light emission amount based on an aperture value of a photographing optical system and a program diagram.

7. The image capturing apparatus according to claim 6, wherein the control unit makes the second light emission amount smaller than the first light emission amount within a range where a cycle of the focus detection is not delayed more than the predetermined cycle.

8. The image capturing apparatus according to claim 6, wherein the control unit increases the second light emission amount more than the first light emission amount in a case where the cycle of the focus detection does not become faster than the predetermined cycle with the first light emission amount.

9. The image capturing apparatus according to claim 6, wherein the control unit does not increase the second light emission amount more than the first light emission amount in a case where the cycle of the focus detection does not become faster than the predetermined cycle even if causing the assist light device to emit light with a light emission amount of the upper limit value.

10. The image capturing apparatus according to claim 3, wherein the control unit increases the second light emission amount in a case where reliability of focus detection is lower than a first threshold.

11. The image capturing apparatus according to claim 10, wherein the control unit makes the second light emission amount to be equal to the first light emission amount in a case where the reliability of the focus detection is higher than the first threshold and lower than a second threshold, which is higher than the first threshold.

12. The image capturing apparatus according to claim 3, wherein the at least one processor or circuit is configured to further function as a subject detection unit, and wherein the control unit increases the second light emission amount in a case where a subject has not been detected by the subject detection unit.

13. The image capturing apparatus according to claim 1, wherein the assist light device is an LED built in a body of the image capturing apparatus or a strobe connected to the body of the image capturing apparatus.

14. The image capturing apparatus according to claim 13, wherein the control unit acquires an upper limit value and a lower limit value of a light emission amount of the assist light device from the strobe in a case where the assist light device is built in the strobe.

15. A method of controlling an image capturing apparatus including a photometry unit that performs photometry of a subject and a focus detection unit that receives light from a subject and performs focus detection, the method comprising:
   controlling an assist light device that emits assist light for illuminating a subject,
   wherein the control includes controlling a light emission amount of the assist light device in such a manner that a cycle of focus detection according to time required for the focus detection unit to perform focus detection becomes faster than a predetermined cycle, based on an output of the photometry unit.

16. A non-transitory computer-readable storage medium storing a program for causing a computer to execute a control method of an image capturing apparatus including a photometry unit that performs photometry of a subject and a focus detection unit that receives light from a subject and performs focus detection, the method comprising:
   controlling an assist light device that emits assist light for illuminating a subject,
   wherein the control includes controlling a light emission amount of the assist light device in such a manner that a cycle of focus detection according to time required for the focus detection unit to perform focus detection becomes faster than a predetermined cycle, based on an output of the photometry unit.

* * * * *